United States Patent
Vila Closas (10) Patent No.: US 8,319,810 B2
(45) Date of Patent: Nov. 27, 2012

(54) METHOD AND DEVICE FOR ROTATIONAL MARKING

(75) Inventor: Oscar Vila Closas, Manresa (ES)

(73) Assignee: On-Laser Systems & Applications, S.L., Manresa (ES)

( * ) Notice: Subject to any disclaimer, the term of this patent is extended or adjusted under 35 U.S.C. 154(b) by 209 days.

(21) Appl. No.: 12/735,287

(22) PCT Filed: Dec. 31, 2008

(86) PCT No.: PCT/IB2008/055596
§ 371 (c)(1),
(2), (4) Date: Jun. 29, 2010

(87) PCT Pub. No.: WO2009/087542
PCT Pub. Date: Jul. 16, 2009

(65) Prior Publication Data
US 2010/0283825 A1 Nov. 11, 2010

(30) Foreign Application Priority Data
Dec. 31, 2007 (ES) .................................. 200703492

(51) Int. Cl.
*B41J 3/407* (2006.01)
(52) U.S. Cl. .......................................... 347/229; 347/248
(58) Field of Classification Search .................. 347/224, 347/225, 229, 234, 248
See application file for complete search history.

(56) References Cited

U.S. PATENT DOCUMENTS

| | | | |
|---|---|---|---|
| 2003/0052100 A1* | 3/2003 | Philipp et al. | 219/121.69 |
| 2005/0253306 A1* | 11/2005 | Piriwe | 264/482 |
| 2008/0121604 A1* | 5/2008 | Di Cagno | 215/230 |

OTHER PUBLICATIONS

Lay Zr. OnKorck; Notice under section 27/28 of the Patents Act 1990; for the attention of the Commissioner of Patents, IP Australia; May 10, 2012.
Lay Zr. OnKorck; Communication pursuant to Rule 114(2) EPC; For the Examining Division of the European Patent Office; Jun. 6, 2012.

\* cited by examiner

*Primary Examiner* — Huan Tran
(74) *Attorney, Agent, or Firm* — Cooper & Dunham LLP (57) ABSTRACT

The invention provides a method and device for rotary marking or machining of cylindrical materials, preferably natural cork stoppers, agglomerated cork or synthetic materials used to close wine bottles and the like. The device includes at least one feeder system of cylindrical elements, preferably natural and synthetic cork stoppers; means of sensing the presence of such cylindrical elements, a laser system, means to produce the rotation of the cylindrical elements on its axis of revolution, at a variable speed, in a tangential movement compared to the focal plane of the laser system, means of measuring the instantaneous velocity tangential to its surface and direction of rotation, optical correction and focusing means, microprocessor control based means, and means for extracting the cylindrical elements. The laser system comprises means of generating at least one laser beam; means of temporal modulation and switching for the laser beam, and means of spatial modulation of each of the laser beams in a synchronized manner with the instant tangential speed on the surface of the cylindrical element.

24 Claims, 6 Drawing Sheets

METHOD AND DEVICE FOR ROTATIONAL MARKING

This application is the National Stage filing of PCT patent application Ser. No. PCT/IB2008/055596, filed on Dec. 31, 2008, which claims the priority benefit of Spanish patent application number P200703492, filed on Dec. 31, 2007.

The present invention relates to a method and a rotative marking or machining device that uses a laser radiation of cylindrical elements that allows the processing of these cylindrical elements rotating at a variable speed.

BACKGROUND OF THE INVENTION

At present, the marking systems For cork stoppers used in the natural cork stoppers processing industry are based on offset ink printing systems, or marking systems with hot metal marking plates warmed with electrical heaters or by induction.

Also, in the case of natural cork stoppers substitutes, using synthetic materials such as polypropylene, thermoplastic foam or silicone, the process of marking is done by offset printing, tampography, thermal transfer, using special inks and drying methods to help fixing the ink to these materials, with great difficulty due to non-absorption of the material.

In the state of the art, it is known and widely extended in the cork stoppers processing industry the utilization of marking systems usually rotating cork stoppers by contact, such as those described in the invention patents GB164505A, GB187588, US2003/0127000A1, WO01/08893A1, WO95/13883A1, WO2004/080813A2, US2003/0118745 where the process of marking stoppers is generally done by techniques of: 1) temperature and pressure applied on the body of the stopper through a hot metal stamp or plate, maintained at high temperatures and generated through electrical heaters or induction of high-power in contact with the marking plate, which it has previously been mechanized to have a relief according to the shape of the logo or image that the winery wants to see transferred into the body of the stopper, and that due to the temperature and pressure applied on the body of the stopper will result in a mark based on the color change of the affected area of the cork due to the effect of "roasting" darker and/or deep depending on temperature and/or pressure applied; 2) ink of one color; 3) several inks.

Nowadays the stamp plate must be made to place it into the marking stoppers machine. The manufacture of this stamp (silicone or metal, depending on the marking: by ink or by temperature and pressure) it is outsourced to specialized mechanical companies.

Another drawback of the cork marking process using stamps, is that the cork stopper processing company is forced to store each one of the marking plate sets, requiring large storage space in the production facilities as the years go by.

It is also true that these marking plates require maintenance, repair and replacement in many cases for other new marking plates, because by using them they become completely or partially damaged.

The process of body marking of cork stoppers with ink (heads or flat sides are marked with hot metal plates) requires a 24 hours drying process in order to ensure the ink is well fixed on the stoppers surface.

Each phase of the stopper manufacturing process, especially those that require the application of products for its treatment, it is usually made in batches between 5,000 and 20,000 stoppers in the same machine to which chemicals are added in the appropriate quantities and proportions. At present and at the end of the process, stoppers do not usually incorporate any information related to these batches called "washing batches." Therefore, if the winery finds, within the entire order, a sole stopper without the appropriate chemical treatment (as an example—too much paraffin, poor color matching, etc.), the winery for security tends to return the whole order to the cork processing company, which can involve batches up to 100,000 with the inconvenience that this may represent.

Today, for process traceability reasons, it is increasingly required to divide the stoppers into lots to take control. This division included on the marking pattern represents a big problem for the current systems, since it involves an ongoing marking plate change or changing some parts of the marking plate, as if it was a numbering revolver that changes numbers. Usually this process is manual and limited to a few numbers/letters and requires stopping the marking process to clean and substitute the marking plates with the numbers to change.

Once everything is ready, the ink marking process takes place as follows: the marking plate is to absorb ink to mark the stoppers. This process is done continuously, where one stopper after another are rolled at high speeds and forced to pass under a tangential rotating wheel that contains the marking plate attached around this rotating wheel which has previously been impregnated with a particular amount of ink, transferring the ink that a roller had previously deposited in the relief of the marking plate.

On the other side, even though this ink marking method since its introduction years ago reached a greater image resolution for wineries in their marking on the stoppers, bringing to these marking patterns drawings of castles, profiles of the winery and its landscape, grounds flowers, etc., compared with the markings of the stoppers obtained previously with the old hot marking plates/metal stamps previously used for marking by heat and pressure, it is noteworthy that the process still includes serious and annoying inconveniences associated with the ink marking, and especially in low-porous materials such as cork and that the cork industry needs to improve.

Some of the drawbacks associated with ink marking stoppers are: 1) The difficulty in performing marking patterns whose images/logos have large areas that should be marked, resulting in a cluttered image by excess of ink; 2) the need to let the cork stoppers dry for about 24 hours after being marked with ink, prior to the next silicone/paraffin process described; 3) using a specific ink for application in materials for the food industry, that it is being used to only mark the body of the stopper, not being allowed by the health authorities the use on the ends because sooner or later one of the ends will be in contact with the beverage contained inside the bottle in question; 4) when changing a marking plate/stamp it is required to stop the machine between 5 and 10 minutes not only to replace the marking plate, but also clean up the marking mechanism and avoid the accumulation of waste that would hinder the process and deteriorate the marking quality (it has been measured the machine's stop average time for cleaning and changing marks made by a qualified operator who oversees two ink markers, in about 1 hour a day per shift); and 5) the use of inks in food products that governments' of all countries and end users in general to eliminate to avoid risks of food contamination consumers.

Although such systems work quite well, they require high maintenance, have consumables and marking plates costs, and require high labor for such tasks as well as monitoring which represents a clear disadvantage for the industry.

On the other hand, published patent application WO2004/007599 discusses the preparation of a type of synthetic stopper formed by mixing thermoplastic foamed material with special additives for the reaction to laser radiation, as well as the specific method for marking these stoppers. To point out that the patent refers to the method of marking synthetic stoppers of that composition, that should be previously made with the right mix including the special additive, in addition to a specific type of laser for its marking, and an optical setup and focalization that are critical to achieving a proper result that does not mar the surface of the stopper, resulting in a low reliability marking process, low speed and the inability to mark the whole body of the stopper as well as their heads, a high investment and a variable cost (additive).

Despite the existence of various laser techniques, already combined in other previous patents and for other applications, neither they are presented in this invention's configuration, nor are able to generate the benefits described in the following paragraphs, much less in the processing of materials with cylindrical geometry and rotational movement at high speed such the case of the cork stoppers.

Moreover, in the past, certain technological barriers have created a bias against the use of lasers to form high-speed graphics in cork stoppers or cylindrical surfaces rotating at high speed, primarily due to two reasons: 1) High frequency repetition rate pulse generation, with variable duty cycle and frequency, pulse to pulse, especially with infrared laser types (FIR); and 2) means of spatial modulation able to generate modulation frequencies up to 800-1000 Hz and mechanical amplitude angles up to +/−30 degrees.

In the market there are different types of laser generators according to the generated wavelength and power, which include the infrared radiation generation ($CO_2$, Nd:YAG, Nd:$YVO_4$, . . . ) with the $CO_2$ being the most appropriate for the application described below due to the significant absorption of the described material (natural cork). There is, however, an existing a serious problem that impedes the direct use in this application of any of the above mentioned, mainly because none of them is capable of generating frequency pulses above 100 kHz. (This application may require repetition frequencies above 500 kHz.) with duty cycle and frequency variable from pulse to pulse, and constant power level along each pulse length.

At the time that these settings were tried, the result was that the laser was not able to produce a regular marking, either was making holes, burning in-depth, or melting the material in the contact point with the laser beam, generating defects in the material to be processed, or that the maximum acceptable speed for the process was so slow that it was necessary to rule out the technique for not being able to be industrialized and require high investment.

In the event that such technological barriers would disappear, a laser system would be a desirable method to generate logos and high definition images on stoppers and cylindrical materials, while allowing an electronic control with all the added benefits due to the latter, such as the generation of variable codes to, as an example, insert traceability information of the material to process, batches, dates, sequential numbers, and alphanumeric codes defined by the user, even mixed with images and logos that up to date are being marked on the surface of these materials, electronic storage designs reducing the space needed, etc.

The main purpose is the marking process speed to ensure the productivity expected by the market, in line with the existing cork handling equipment. This object not only directly affects to the type of laser and the spatial and temporal modulation systems to use, which should have benefits far superior to those available so far on the market, but also how these elements are managed to get the most of those resources.

Another object of this invention focuses on how the cork stopper travels in the handling process as well as how to ensure the entire perimeter of the body is being displayed, in order to be able to mark it completely. This defines the ergonomics of the application and programming software that controls and synchronizes the entire process.

At present, there does not exist any laser marking system that uses the technology described below, representing the invention of a method and systems with an improved technology compared with current systems.

SUMMARY OF THE INVENTION

The objective of this invention is to solve the problems mentioned above, developing a method and an arrangement for rotational marking of cylindrical elements by means of a laser radiation that allows the processing of these cylindrical elements rotating at a variable speed with the advantages listed below.

This invention allows cork stoppers handlers to make the marking process without the need to manufacture any kind of stamp or marking plate, or use any consumable product (ink marking or cleaning solvents). The sole requirement is the image to be reproduced, usually given by the same winery/customer. This image in digital format will be introduced in the process control system allowing the marking process to begin without delay. This point will streamline the production process in about 3-4 days because avoids the marking plates intermediate manufacturing process and its set-up as well as cost savings due to the associated costs (marking plates manufacture, its transport) if one takes into account the existing marking methods.

In addition, this configuration avoids having to stop the marking process to change marking plates. Being a process with electronic control, it allows changing the marking pattern between a stopper and the next, without having to stop the process.

Moreover, this invention completely eliminates the maintenance and cleanup associated with the use of inks and metal hot marking plates, or due to wear in the contact process.

The arrangement of the present invention on the contrary performs the marking with no contact, avoiding disruptions and frequent maintenance of the existing technologies.

This same property (non-contact marking) also ensures a proper marking around the whole stopper even in the irregular areas, unlike the previous systems with contact, which could not properly reproduce the marked pattern on those stopper areas with a groove, canal or relief difference.

All this represents a large savings in maintenance, labor, manufacturing cost of the marking plates and solvent, inks and consumables, as well as increased productivity and higher quality due to not requiring stopping the process.

The method of the invention, in addition to saving between 48-72 hours in the process by eliminating the manufacture and transport of the marking plates. Besides, it speeds up by at least 24 hours per item the processing time, by not having to wait for the ink marked corks to dry.

The invention method improves upon one of the big difficulties in the current methods and systems for ink and hot-stamp marking, which delivers poor marking quality especially on areas with a high density of color, because the ink cluttered surrounding areas, and the metal stamp burned too much the surface due to excessive temperature.

Parallel to this, the method and associated device permits the technology used for marking the body of the stopper to be used for marking the flat sides as well, resulting in a method and system that can mark all surfaces of the stopper, avoiding the current combination of techniques. Currently this is done in two separate processes and machines: the cylindrical surface usually with ink, and in another marking station, the flat surfaces with hot metal plates (pressure and temperature), due to health regulations that prevent the use of ink in the flat sides being in contact latter on with the drink.

Moreover, the laser method of the present invention, because it does not use harmful products such as inks and cleaning solvents, does not create any risk to the food product that later on will be bottled and sealed with the cork stopper, as a result being a process that respects the environment.

Alongside these benefits, other benefits are due to the increased opportunities this new technology offers to the field of use, such as the possibility of 1) mark variable information for traceability of the process of handling cork; 2) quality improvement on the images being reproduced on the stoppers; 3) ability to generate monochrome images or that have different shades (unlike previous technologies that in all cases could only generate a single tone monochrome images); 4) ease for marking short series of items at no extra cost and without affecting the productive capacity, enabling the marking business to enter into a new market segment added to its current customers categories, with higher added value such as the customized closures, while continuing making large batches with all the mentioned improvements.

The process is innovative due to an improvement in the marking quality, a reduction in the stoppers manufacturing costs, improved delivery times to customers, ease of process start-up, allowing the realization of short and customized series, as well as allowing the introduction of variable traceability codes or different numbers in each stopper, and respectful with the environment as it does not require inks or solvents.

The method and rotary marking device of this invention allows marking cylindrical elements on all sides at a speed exceeding 4,000 $mm^2$/s, achieving in the described preferred realization speeds up to 16,585 $mm^2$/s, allowing the marking of more than 18,000 stoppers per hour.

In a further preferred implementation, speeds close to 55,000 $mm^2$/s have been reached, corresponding to the marking of more than 60,000 items per hour.

The method for rotative marking of cylindrical elements of the invention, preferably natural cork stoppers, agglomerated cork or synthetic materials used as closures for containers, includes the following steps:

A. placing of at least one cylindrical element in one or more rotary continuous or indexed motion systems, in the optical field of action of a marking head or spatial modulator of a laser system;

B. detecting of the instantaneous tangential velocity at the surface of the cylindrical element on the system of continuous or intermittent motion;

C. positioning the laser beam on the surface of the cylindrical element, by means of spatial modulation of the laser beam in a synchronized manner with the instant tangential speed at the cylindrical surface of the element; and D. applying a continuous or pulsed laser radiation on the surface of the cylindrical element, until completing the marking of at least one dot or line of a predetermined pattern.

The application of a continuous or pulsed laser radiation on the surface of the cylindrical element moving, dot by dot, is preferably done during a minimum of a certain number of adjacent dots in the same line of the image to be processed Alternatively, if there are several spatial modulation heads, each one is fed by each of the laser beams or deflected orders obtained in the stage of temporal modulation and switching.

The switching process among the various marking heads is repeated line by line, marking head to marking head during the rotation of each cylindrical element, until a predetermined pattern is completed, usually the logo of the winery that purchases the stopper, replacing at this moment the cylindrical element already processed by a new one to be processed and continue again.

The management of this communication between marking heads may optionally be performed by a state machine communicated with each of the controllers of each of the marking heads.

Advantageously, while a first cylindrical element is being marked, the device begins marking a second cylindrical element in a second system of rotatory movement placed in the same optical field of action of the same marking head, so that while the first one is being processed the other can be replaced by a new stopper without productivity loss, redirecting the laser beam at high speed on the second, once the first is finished.

In another embodiment, and thanks to the incorporation of multiple heads and an acusto-optic switching element for the laser beam, the method provides that while the marking head's spatial modulation means are in their positioning process (required but previous to the marking process, and as it may involve large percentages of non-productive time in a marking cycle), the laser beam is redirected to another marking head which has spatial modulation elements ready to continue the marking process on another stopper located in such marking head. This is a key feature of the invention, which ensures the reduction of downtime of use of the laser beam during the marking process of cylindrical elements.

Advantageously the method includes at least one sub-stage that places at least one of the stopper flat sides (or none, in case of corks not requiring the marking of any of the flat sides) of the cylindrical element against the laser system optical path, in sequence after the rotary process, through the appropriate tooling.

Also, the cylindrical element is placed in a second system for marking by means of laser radiation, for marking at least one of the flat surfaces of the cylindrical element.

In addition, the present invention includes a stage for error detection, both in the flat sides and in the body of the cylindrical element, by comparison with a predetermined master pattern or a range of them.

Further, the present invention also includes a stage of cork sorting and routing.

Additionally, the present invention also includes a stage for applying silicones and paraffines.

Also, the cylindrical element is treated for bleaching or color matching, and classification.

The rotating cylindrical material processing device of the present invention, preferably for natural cork stoppers, agglomerated cork or synthetic materials used to close drinks like wine or similar, is suitable to perform the method described above. It includes at least one feeding system of cylindrical elements, preferably natural and synthetic cork stoppers; means for sensing the presence of such cylindrical elements, a laser system, means to produce rotation on the axis of revolution of these cylindrical elements at high-speed, keeping its surface tangentially to the laser system focal plane, means for measuring the tangential velocity and direction of rotation, optical correction and focusing means, microprocessor-controlled means, and means for extracting the cylindrical elements. The laser system comprises means for generating at least one laser beam; means for temporal modulation of the mentioned laser beam and means for spatial modulation of the laser beam.

Preferably, the laser being used has a wavelength between 0.2 and 11 µm, preferably between 0.5 and 11 µm, preferably between 9 and 11 µm for natural cork and preferably between 1064 nm and 532 nm for synthetic stoppers. The laser beam may be temporarily modulated at frequencies in the range of 0.1 Hz to 2.5 MHz at variable duty cycles, preferably between 0.1 Hz and 500 kHz. The laser beam may be formed according to a substantially Gaussian distribution.

According to a first option, the laser beam generator is preferably a gas laser, preferably a sealed $CO_2$ laser with linear polarization and an $M^2$ factor close to 1. This laser beam is generated with a continuous wave (CW) or pulsed through an electronic temporal modulation applied to the laser generator's power supply. The laser beam is modulated at frequencies in the range of 1 to 500 kHz, preferably between 50 and 500 kHz. The laser beam pulses have a duration within the range of 0.5 to 400 µS. The laser beam is also modulated at variable duty cycles in the range of 0% to 100%.

According to another option for the modulation means, the laser beam is generated in a pulsed manner, by means of a modulator outside the laser cavity, that includes at least one of the following modulation systems such as a "chopper," an electro-optical modulator, an acoustic-optical or piezo-electric modulator, preferably acoustic-optic type.

According to this modulation option, the modulator generates a laser beam deflection of at least one first order at a resulting angle with respect to the original beam axis, also known as zero order, controlled by means of controlling the frequency value of the radio frequency, and the laser's wavelength being used. Optionally, the first order or other resulting deflected orders are optionally guided to collimating means (as an option this collimation could be done prior to the modulation element) and then guided to the marking head or spatial modulator, which subsequently will be used to process the cylindrical material while the 0 order is driven to a beam dump and is discarded in a controlled manner. First order and higher reflected laser beam orders (if any) are directed towards collimating means, and later, and isolated from the rest of deflected orders, guided to the spatial modulation system. Also under this modulation option, the pulses generated by means of modulation, have a duration in a range between 0.3 and 1000 µS, preferably between 0.7 and 50 µS. According to a preferred option, a substantially flat power distribution is applied along the pulse length, specially for pulses shorter than 40 µS.

In case of using means for switching and temporal modulation, where the output angles of the various obtained orders depend on the wavelength of the laser beam being used, and as long as this significantly affects the operation of the system through a random error position, correction of the error pointing position will be implemented.

According to this option, the type of laser generator is a gas laser, where laser power is applied in a range between 10 and 300 w, preferably between 30 and 150 W.

According to another option for the invention, the laser beam generator is of solid state type, semiconductor or fiber-laser, preferably solid state. This laser beam is generated on a continuous (CW) or by using a pulsed modulator also called Q-switch, intra-cavity or external, of electro-acoustic transducer type or acoustic-optic transducer, preferably an acoustic-optical transducer. Pulses generated by the modulator or Q-switch have a duration ranging from 1 nanosecond (ns) and 400 microseconds (µS), preferably between 4 nS and 20 µS. Under this option for generating laser, laser power is applied in a range between 10 and 300 w, preferably between 30 and 100 w and a peak power in a range between 10 Kw and 500 kW.

Advantageously, the laser beam being focused at the surface of the cylindrical element's body has a substantially circular shape.

Laser light is modulated either in time through the laser generator's power supply modulation signal, or either through intra-cavity modulators, or through an external modulator based on a "chopper", an electro-optical modulator, acoustic-optical or piezo-electric, that allows pulse generation such as:

Short duration, preferably between 1 ns and 400 µS;
Variable frequency, preferably between 0.1 Hz and 2.5 MHz;
Variable duty cycle, preferably adjustable between 0% and 100%; and
Stable power for the whole duration of the laser pulse.

Advantageously, the laser beam leaving the means for temporal modulation is modulated using means for spatial modulation that includes at least one of the deflection system types such as spinning polygonal mirror, a piezoelectric scanner, a high resolution acoustic-optical deflector, a linear guide, or preferably a galvanometric scanner system set.

Advantageously, the laser beam is applied during a time range between 0 and the maximum exposure time available, depending on the duration of the line and the number of dots generated along it, for a given dot, belonging this dot to the line or the XY plane being reproduced.

The laser beam from the laser generator, or optionally from the temporal modulation means, is collimated and expanded in diameter in a range between ×1.1 and ×7 times their original diameter, preferably through a collimator.

The repetition of laser pulses are synchronized in time and space with the position of every available means of spatial modulation.

Laser light resulting from each of the deflected beam orders obtained in the temporal modulation and switching stage, is spatially modulated by at least one of the deflection types such as, spinning polygonal mirror, piezoelectric scanner, high resolution acoustic-optical deflector, linear guide, or preferably a set of XY galvanometric scanners, which is capable of deflecting the temporarily modulated laser beam, at high speed along the scanned line (1D) or along the working field (2D) of the cylindrical element, preferably at a line scanning rates up to 1000 Hz, which is controlled by electrical or optical, digital or analog signals, from the processing control unit that manages the system.

The means for spatial deflection are based on a minimum of one piezoelectric system, or galvanometric scanner which incorporates a mirror attached to its axis of rotation, which is suitable for the reflection of the laser's wavelength and power density being used.

Each scanner, in case of using multiple scanners, describes a movement with a mechanical angle within a range −30 to +30 degrees.

Optionally, the spatial deflection includes at least one motorized spinning polygonal mirror, allowing a single axis deflection at a controllable speed, or two axis deflection if combined with another of the described methods.

Optionally, the spatial deflection means are based on a high resolution acoustic-optical deflector, with one or two deflection axes, which is controlled through a variable-frequency oscillator or frequency synthesizer, so that by varying the frequency, deflection angle varies in proportion to the first.

The laser beam is applied during a time range between 0 and the maximum exposure time available (depending on the duration of the line and the number of dots generated along it), for a given dot, this dot belongs to the line or the reproduced XY plane, being the intensity of affectation of the material proportional to the product of exposure time by the power density of the focused laser beam.

The laser pulse repetition whatever its duration, is synchronized in time and space with the position that every available means of spatial modulation, resulting in a dot or a line in a desired position on the material, which has an intensity of effect proportional to a preset parameter.

Advantageously, the dot repetition, or scanned lines, is synchronized with the movement or progress of the lateral surface of the cylindrical element to be marked by means of measuring speed and direction as well as means for sensing the cylindrical element, preferably the means for measurement speed and direction including an incremental tachometer coupled to the axis of rotation of the cylindrical element's rotation system. This coupling can be direct or through a flexible connection, with a direct tangential contact with a wheel, or gear, i.e. coupled to the axis of rotation of the cylindrical element's rotation system, and being the preferred means of sensing of cylindrical elements an electrical or optical signal from the stoppers feeding control unit, or from a sensor.

Preferably, the rotating speed of the material to be processed is managed during the process in order to reduce downtime due to the perimeter areas that do not require any processing but have to be rotated until spatial modulation means can access to such new area to be processed.

This management is carried out preferably by an isolated process for each of the cylindrical elements to be processed in the various work stations (marking heads) that have at least the following steps: 1) analysis and pre-processing of the workload or time required in each of the sections along the rotation angle of the cylindrical material; 2) description of a "cam" or graphical angular position versus time describing this work load; 3) synchronizing the starting point of execution of the mentioned cam, with the rest of processing along the material; 4) generation of the motor control signal (servomotor) in charge of rotating the cylindrical element that accurately reproduce the cam; and 5) measurement of the instant position at all times by means of measuring as described above.

When using two axes of spatial modulation, the two deflection elements are arranged in a manner that are adequate to guide the laser beam along an XY plane, so that the laser is initially guided to the first of the deflectors (X), then guiding the deflection obtained in the first element to the 2nd deflector (Y), and finally leading the resulting combined deflection to the focal lens, resulting in a change of position of the beam on an XY plane.

Laser light is focused by optical means at the surface of the material to be processed in motion, preferably by a f-Theta lens-type, pre-focal lens or optical systems for dynamic adjustment of focus such as "3D". The focusing means have a focal length that combined with the angle of laser beam projection (depending on the technique being used), allow covering an axis or a marking field, in this latter case the size of one side, in the range between 40 and 200 mm, preferably between 50 and 120 mm.

The laser beam is focused on the surface of the cylindrical material in motion, resulting in a range between 0.005 and 1 mm of spot diameter, preferably between 0.1 and 0.2 mm for stopper's marking, or preferably between 0.01 and 0.04 mm for micromachining.

Continuous (CW) or temporarily modulated pulsed laser light, collimated, spatially modulated and focused, is applied along a line (or raster) prepared along the height of the cylindrical body of the material, and repeated raster by raster to form a compact image synchronously with the rotation of the cylindrical element.

Laser light is applied so that the intensity of the beam along the line varies in a controlled manner through the effect of the temporal modulation or through the laser's power supply modulation signal. Control of the intensity is adequate to carry out a reproduction of an image reproduced raster by raster (line by line).

By applying the appropriate laser radiation intensity resulting on a thermal effect on the natural cork, this produces a color change on its surface, usually to a greater or lesser dimming ratio, allowing the reproduction of monochromatic images or color shaded images, depending on the applied intensity, concentration and pulse duration of the laser beam being used.

Optionally an additive applied on the natural or synthetic cork surface can be used, that excited with the suitable wavelength, concentration and pulse length, this additive reacts with a surface color change without affecting the surface structure of the material, but setting the additive and forcing to change the additive's color.

Advantageously the device also includes means of marking verification, preferably based on vision systems. Includes means for image capture during the rotation of the cylinder, captured line by line from the marked cylindrical body, preferably using elements such as a matrix vision camera of at least one row of pixels, with appropriate acquisition time according to the repetition rate, and appropriate lighting, being the captured image compared to a predetermined image pattern, to reject each of the markings that do not have a significant resemblance to the master pattern, or if a flaw in the cork shape is detected, not being detected at earlier stages of the process or if such flaw was produced after the stoppers inspection and classification.

With a signal from the control unit of the marking inspection process, a wrong marked or defective cork can be rejected, so separated from the rest of caps marked correctly and in good condition.

Optionally a final step in the process involves application of silicone and paraffin to deliver the final finish of cork stoppers, so it facilitates the insertion and extraction of it into the neck of the bottle.

The marking and inspection processes are managed by a control unit that runs suitable algorithms for carrying out the method described.

Advantageously the device also includes ways to classify such expelled cylindrical items.

Advantageously marking is produced on additives, applied to the cylindrical surface of the element, after the construction of the stopper.

Then and in order to facilitate a better understanding of this description and being part of it, an accompanying series of figures on which to be illustrative and not limiting, the subject of the invention was represented.

BRIEF DESCRIPTION OF THE DRAWINGS

For better understanding of the above, accompanying drawings in which, schematically and only by way of example not limitative, following description represents a practical implementation.

DETAILED DESCRIPTION OF THE PREFERRED EMBODIMENTS

In a preferred embodiment of the invention, the configuration of the laser marking system consists of: 1) means for the generation of laser radiation based on a 100 w sealed $CO_2$ laser, excited by radio frequency with linear polarization; 2) switching and temporally modulating means, of at least one output port, based on a Germanium acoustic-optical modulator excited with a minimum of an RF signal which includes a minimum of 1 frequency; 3) means of collimation for each previously obtained switched beam based on a beam expander; 4) means of spatial modulation for each of the previously generated beams, based on a set of XY galvanometric scanners that have been upgraded so are able to swing up to 800 Hz to the necessary amplitude required for the application, with mirrors attached at the end of each of its shafts, able to reflect the wavelength and proper laser power concentration of the beam; and 5) means of focusing based on a f-Theta lens made of ZnSe and focal length 100 mm.

According to this preferred embodiment, in addition to the configuration of the laser marking system, this includes feeding means, movement and rotation of the cylindrical items, based on an appropriate tooling for each marking head, based on a dual system of two rotating rollers, on each pair of which is located and turn the cylindrical element to be processed, fed by opposite sides, and the extraction designed so that a stopper can be removed without interfering with the process of marking another stopper, and both stoppers are located in the field of action of the laser beam being projected through the XY spatial modulator and focusing optics.

Each of these toolings or marking stations, include a minimum of a low inertia and variable speed motor, the speed of which will be amended at any time to make the marking process in the shortest possible time following the speed cam described by the pattern to be reproduced.

Each of these toolings also include a change in position of the already marked stopper, at a new position that statically exposes one of its flat sides to the marking field, and then applies a 180° turn to the stopper to expose the other flat side. During the time that each side is exposed, the laser is able to reproduce the required image for each of the flat sides of the stopper.

This preferred configuration allows marking any combination of body and flat sides of a stopper located in one of the many marking stations, while the other stopper located at the same marking station and same marking head, once marked, can be replaced by a new stopper to be marked, while the same is being done in other marking stations, sequentially raster by raster, line by line, stopper by stopper, maximizing the productivity of the method and described system.

As it is known, each type of material to be processed requires a different energy density to obtain an ablation effect, volatilization or of that area as required by each application, so this unit makes a laser beam temporal modulation, while it can optionally perform an amplitude modulation to control the required energy level.

The system of the invention can also include a vision system to detect possible errors in marking, used to separate the items that contain errors from the ones which are correct.

In a realization of the invention, this inspection system consists of a single array matrix camera, with optics and lighting necessary for the acquisition of the image resulting from the marking process, during the rotation of the marking stopper and electronic and program means for its control.

The described system, part of the advantages mentioned above, also requires much less space for installation compared to the current printing technologies, while allowing the stoppers rhythm of work at less than the current technologies, since there are fewer productivity losses in each shift, compared to current ink or heat based technologies.

Figure 1:
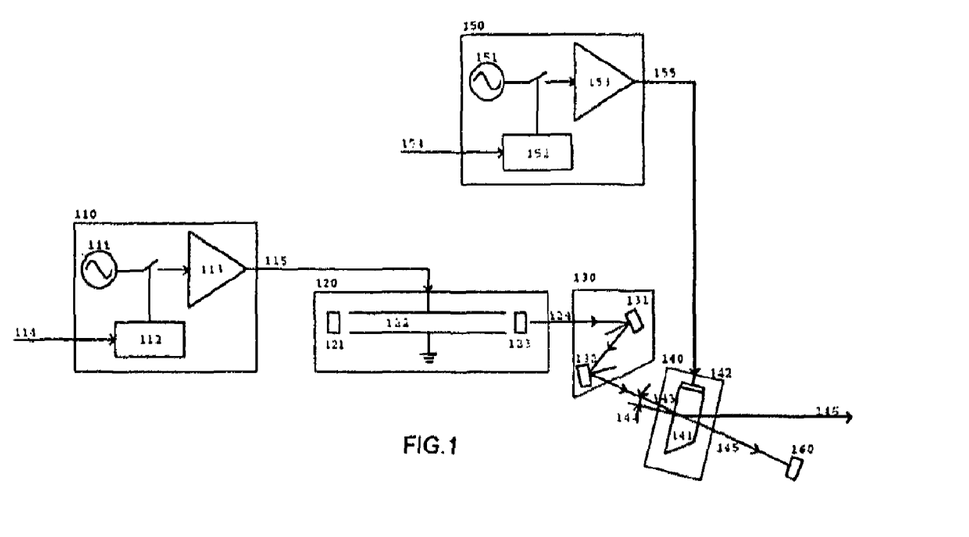
FIG. 1 shows a functional diagram of a preferred implementation of the laser beam generation and temporal modulation, based on a RF generator (110), a laser generator (120), adaptative optic and guided means for laser beam (130), means of temporal modulation and optical switching (140), RF driver (150) with many different oscillators with as many different frequencies (151.1 to 151.n) as the number of marking heads to be used, means of variable attenuation (156) of those signals, that provide equalization of the signal from each oscillator in a separately manner, all this to control the modulation device, and a beam dump (160) that absorbs the not used laser beam in a controlled manner.

FIG. 1 shows a functional block diagram of the preferred implementation for the laser generator and the temporal and amplitude modulator, which uses a master radio frequency generator (110) that includes an oscillator (111), electronic modulation system (112), a high power amplifier (113), used to generate radiofrequency (115) as requested by the electrical modulation signal (114).

The generated high power RF signal (115) is supplied to a laser generator (120) cavity defined between the rear mirror (121) and the front or exit mirror (123) between which are located the cavity electrodes (122) through which the electrical signal being applied (115) generate a strong electric field in the gas medium to excite, resulting in the emission of the resulting laser beam (124), usually continuous (CW).

This is led (130) through mirrors or adaptive optics (131 and 132) to the temporal modulation and switching element (140) based on a Germanium crystal (141) at a certain angle (144) also called Bragg angle referred to the perpendicular of the input window. Germanium crystal has a minimum of an electro-acoustic transducer (142) that converts the RF signal (155) applied on it in a wave of pressure on the crystalline structure of germanium, creating a variable diffraction network inside, depending on the incident frequency, which in turn deflects incident beam (143) in at least one output beam (146.1 to 146.n) of $1^{st}$ to $n^{th}$ order, measured at an angle on the direct beam (145) also called $0^{th}$ order, proportional to the wavelength of the laser and the frequency value of the radio frequency being used (155).

This radiofrequency comes from a controller or driver (150) based on a minimum of a master frequency oscillator (151.1 to 151.n), which is switched and temporarily modulated by a control device (152) according to a logical digital modulation signal (154) that allows changing both the chosen frequency and its amplitude (156), as the duration of the oscillation being generated, thus affecting the amplitude and duration of the laser beam resulting at the particularly selected order deflection.

The resulting beam at the zero order (145) is not useful for the application, which is absorbed in a controlled manner through a beam dump (160).

Figure 2:
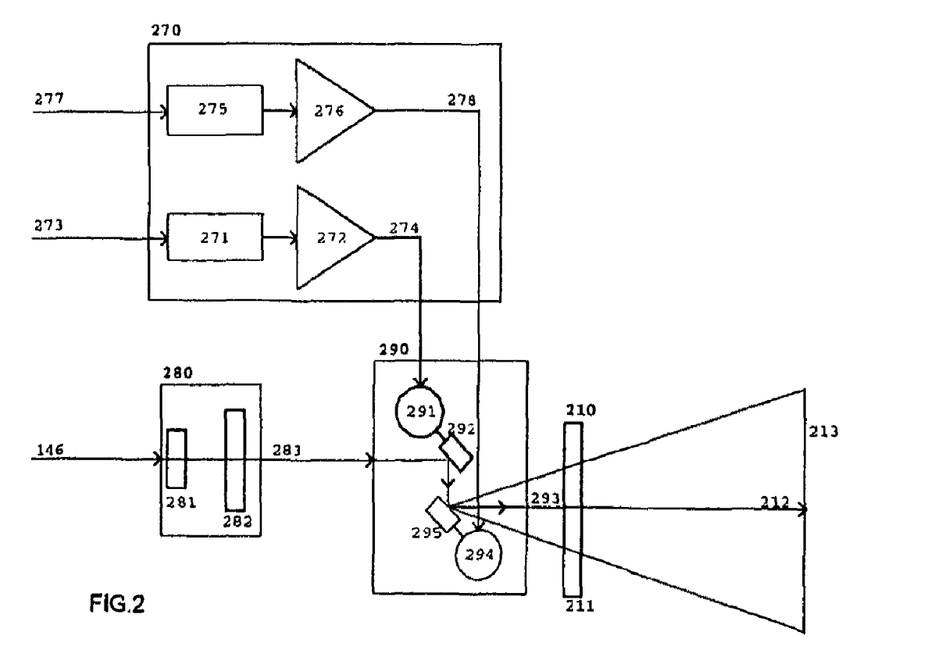
FIG. 2 shows an outline of a functional preferred realization for the collimation, spatial modulation and focussing of each laser beam, based on an adaptative and/or collimation (280) of the optical system for the laser beam (146.1 to 146.n), spatial modulation X and also Y as an option, which includes elements of deflection (290), control elements (270) and the focussing optics (210).

FIG. 2 shows a functional block diagram of a preferred implementation of the means for adjusting the laser beam (146.1 to 146.n) obtained from each of the different deflection orders, based on a beam expander or collimator (280) which is equipped with two lenses (281 and 282) responsible for the proper expansion of the laser beam. The adjusted beam (283) is guided to the spatial modulation device (290) of a single axis (X) or two axes (XY) deflection, based on galvanometric scanners, piezo-electric or spinning polygon mirror, or any combination thereof, where the temporal modulated beam (146.1 to 146.n) as described in FIG. 1, once colimated (283) is guided to the spatial modulation means (290), incorporating a $1^{st}$ deflection axis called X (291) together with its reflective means (i.e. an appropriate mirror) (292) and, optionally, a second deflection axis called Y (294) together with its reflective means (i.e. an appropriate mirror) (295), resulting in a spatially modulated beam (293) capable of being driven in an XY plane (213) which is described as the characteristics of the focusing means (210) based on a prefocal lens, or a dynamic focus "3D" type, or an f-Theta lens-type (211) that describes the distance (212) to the working field (213) where the surface of the material to be marked should be placed.

Each of these spatial modulation means is controlled through its analog or digital drivers (270) which use the control signal X (273) adapted trough the adaptative and predictve logic (271) and then generate the appropriate signal (274) through the signal amplifier (272) used to control the spatial modulator X. The same applies in the case of using a second axis called Y, from the signal (277) and modules (275), (276) and resulting signal (278).

Figure 3:
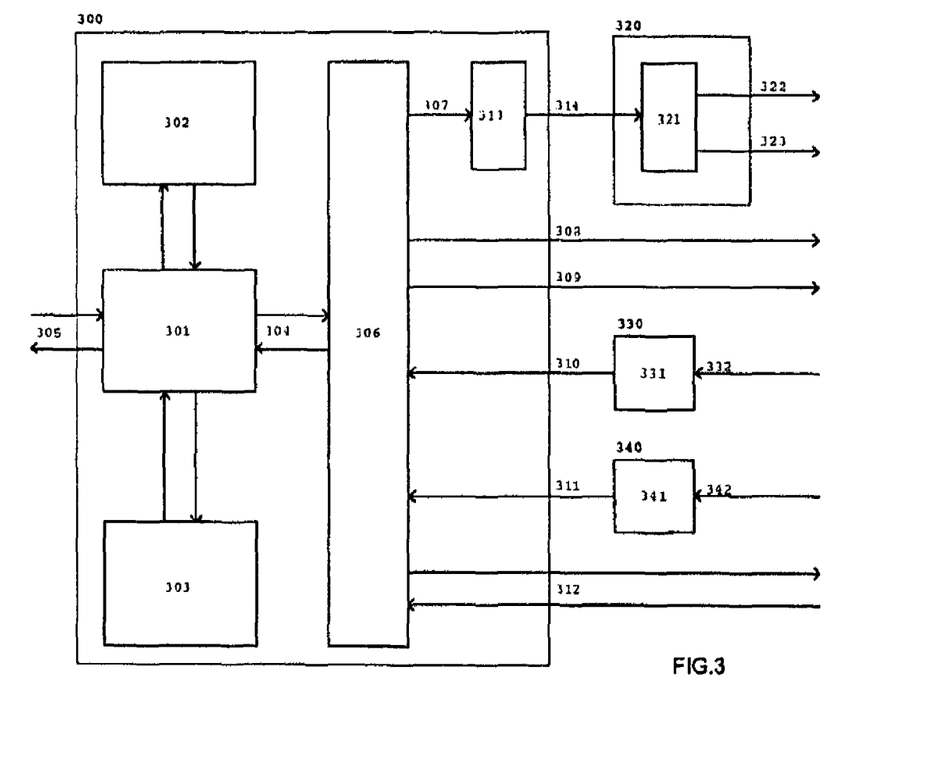
FIG. 3 shows a functional diagram of a preferred realization of a logical control system (300) capable of generating signals and instructions necessary to ensure that at least one element with high-speed serial communication (320) is sending the right signals to each individual set of spatial modulators (270 and 280), while it can receive signals from each of the detection means (330) and also from each of the means of measuring speed and direction of rotation (340) associated with each set of spatial modulators.

FIG. 3 shows a functional block diagram of a preferred implementation of the means of process control and communication with the rest of the system, based on a central processing unit (300) that includes adaptive circuits (301) for the communication signals (305) for communicating with external processes, a static memory (302) to use with the program and algorithms of the process, a memory (303) for storage of digital patterns and their set-up to be used in the application, a data and address bus (304) for communication between the different elements, a central processing unit (306) based on a microprocessor or DSP, which is capable of generating communication signals (307) to each of the deflection or spatial modulation systems, adapted for serial communication through a specific circuit (313) for high-speed serial communication (314), which is latter on interpreted by a receiver with the same serial protocol (320), that thanks to decoding it (321) and converting it to two separate channels (322 and 323) allows communication with the two-channel of the XY spatial modulation system (270).

It also includes other generic and unidirectional communication signals (308 and 309) and bi-directional signals (312) to manage other related processes such as generating control position and speed signals for the low inertia motors of each marking station, to adapt speed of each stopper as the workload at that particular position, and n input signals (310) with the starting signal to initiate the process or sensing the cylindrical element to be processed, from the n means of detection (330) incorporating adaptive logic and regulation (331) to discriminate wrong signals from real ones (332). At the same time includes input communication channels (311) to interpret the signal from the n speed sensor means (340) than through its own internal circuitry (341) are capable of communicate the instant speed and direction of displacement (342).

Figure 4:
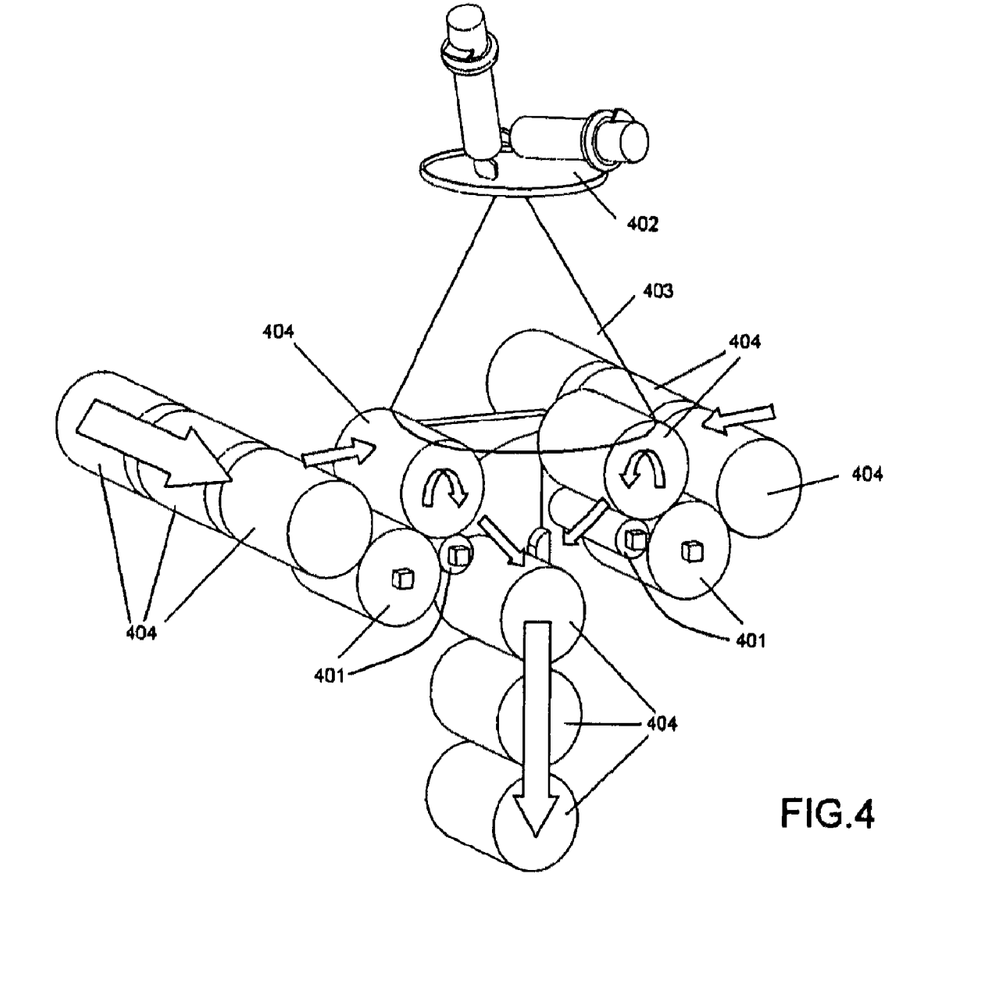
FIG. 4 shows an outline of a constructive rotary device for each laser head (1 ... n), which reveals the means to produce rotation (401) of the cylindrical elements (404) on its axis of revolution at high speed, the spatial modulation means and focusing of the laser system (291, 294 and 210) and the cone (403) covering the modulated laser beam (293).

FIG. 4 shows a constructive outline of a rotary device for laser marking at each marking head (1 . . . n), which reveals the means to produce rotation (401) of the cylindrical elements (404) spinning on its revolution axis at variable speed, the spatial modulation (291 and 294) and focusing means (210) of the laser system and the cone (403) described by the modulated laser beam (293).

Figure 5:
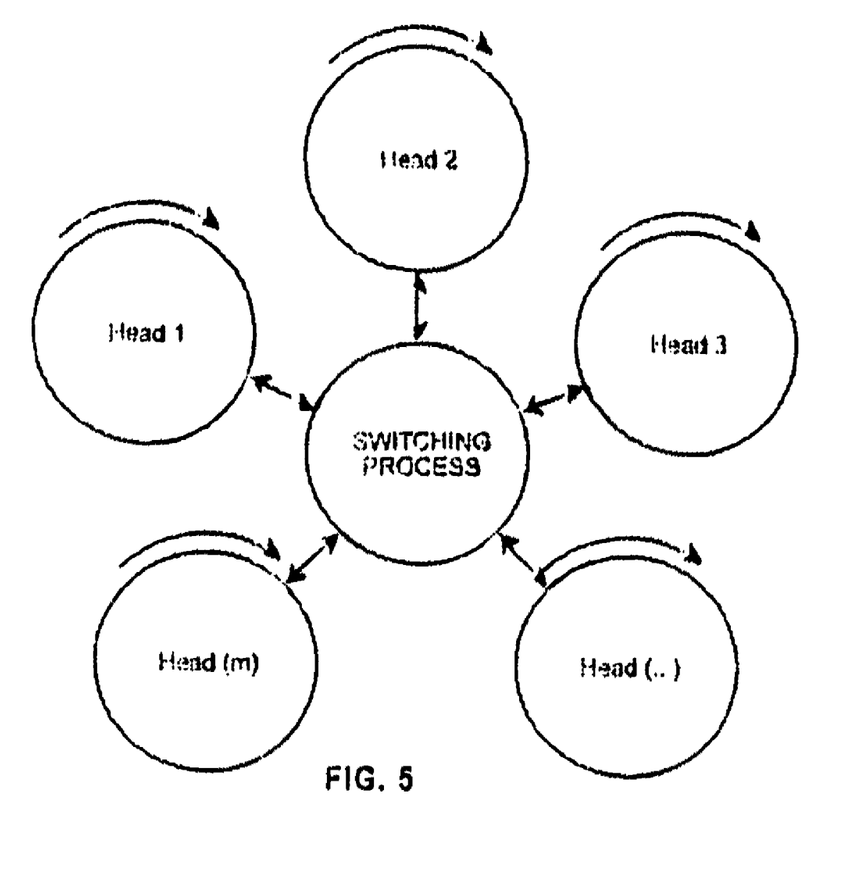
FIG. 5 shows the flow chart of the process of switching between marking heads.

FIG. 5 shows the communication flow diagram between marking heads during the switching process. The main process is in charge of switching the laser beam to each available head at that particular moment in time.

Figure 6:
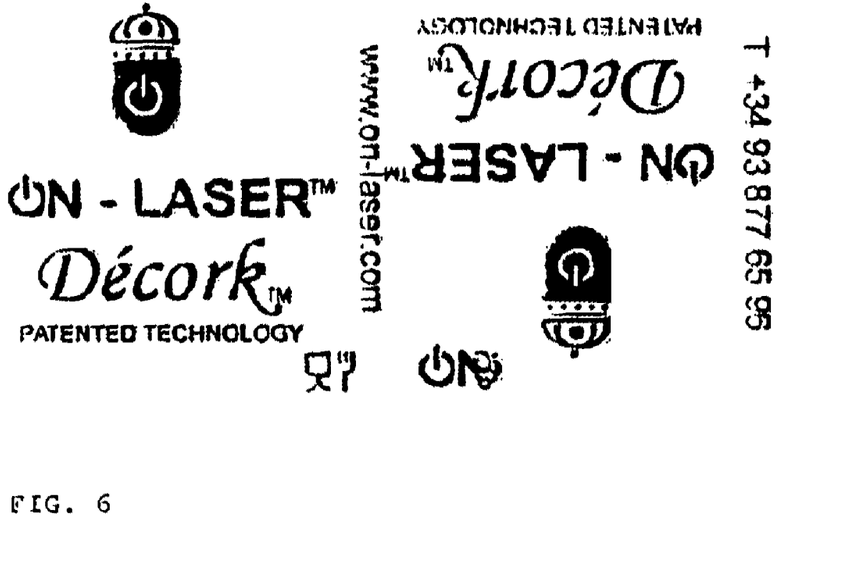
FIG. 6 shows a flat and complete unrolled pattern of the whole cylindrical surface of the element to be marked.

FIG. 6 shows an image or pattern example for the cylindrical surface, unrolled on a plane.

Figure 7:
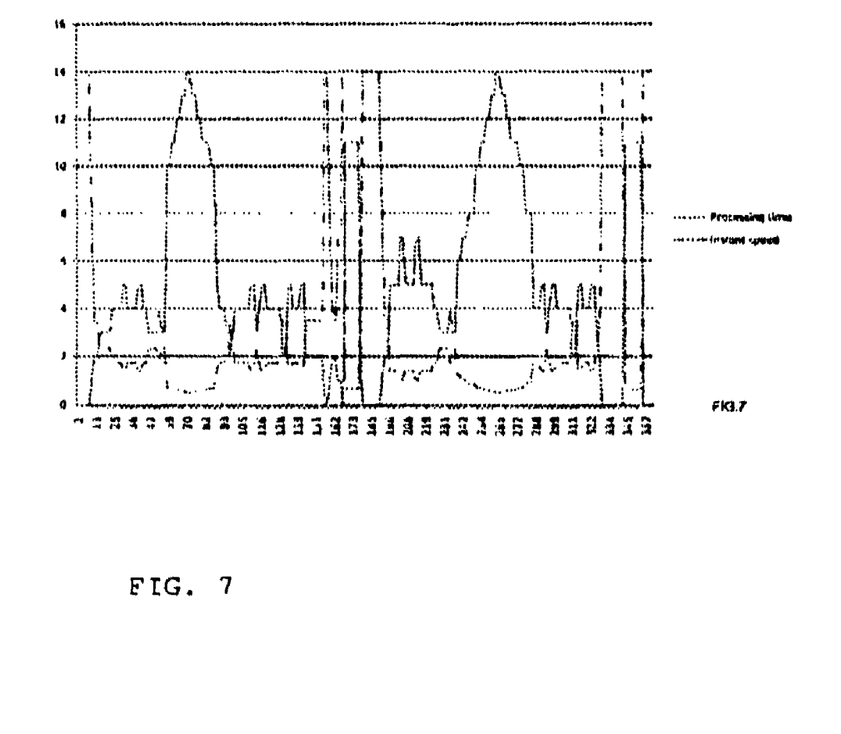
FIG. 7 represents at one end of the chart, the marking time required for each column of points on the image, all depending on the absolute angle (0 ... 360°), according to the position of that part of the image on the perimeter of the stopper and on the other hand, the instant rotation speed that each particular cork will be subjected for the reproduction of that portion of image.

FIG. 7 shows the example of the instant speed chart according to the angular position of the cylindrical element, corresponding to an image pattern (FIG. 6) to be reproduced around the body of a stopper of 44 mm high and 24 mm in diameter, and that would be used to generate the control signal of a variable speed motor, reducing idle time in areas where image do not require any processing.

Figure 8:
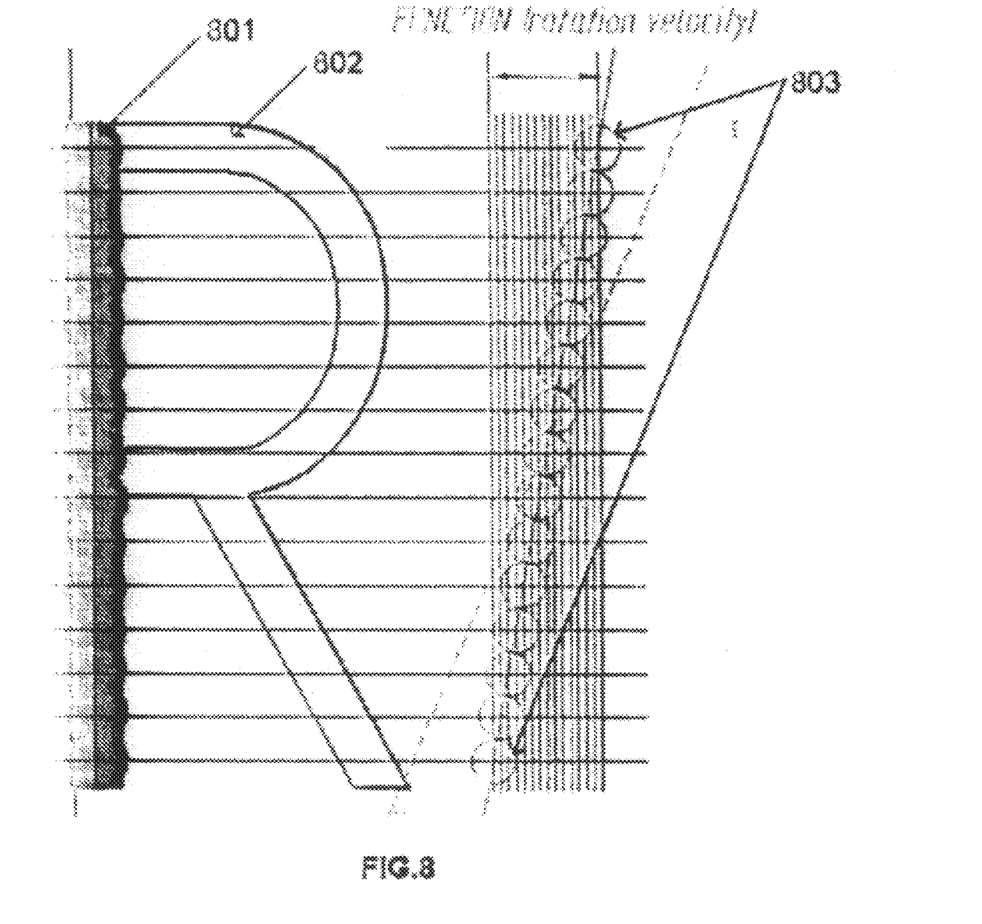
FIG. 8 shows the mark of a straight line made of points (801) of a pattern to be marked (802), and its corresponding curve method for temporal and spatial variation (803) on the cylindrical element synchronized with the position at each instant points on the surface of the cylindrical element.

FIG. 8 shows the details for the marking process of an straight line made by consecutive dots (801) of a pattern to be reproduced (802) and its corresponding temporal modulation curve (dot by dot) and spatial modulation (803) on the cylindrical item synchronized with the instant position for each dot on the surface of the cylindrical element.

Various modifications may be made to the invention without departing from the spirit thereof. It is therefore intended that the invention be defined by the following claims.

The invention claimed is:

1. A method for marking or machining cylindrical natural, synthetic or agglomerated cork stoppers, agglomerated cork stoppers, which comprises:
   a) positioning of at least one cylindrical element in one of several systems of continuous or indexed rotary motion, located in the field of action for at least a marking head or spatial modulator of a laser system;
   b) detecting the instant tangential speed at the surface of the cylindrical element located on the system of continuous or intermittent motion;
   c) positioning a guiding optical system of a laser beam on the surface of the cylindrical element by spatial modulation of the laser beam in a synchronized manner with the instant tangential speed of the cylindrical element; and d) applying focused continuous or pulsed laser radiation on the surface of the cylindrical element to marking of one or more dots or lines of a predetermined pattern.

2. A method according to claim 1, wherein the marking head of the laser system includes at least two rotary motion systems, which have at least one cylindrical item each; and a D stage for the application of the laser beam comprises marking one or more adjacent dots according to a first reproduction pattern; and wherein the method comprises the following additional steps:

selecting a second marking head for marking one or more adjacent dots on a second cylindrical item, the selection based on the reduction of the total amount of time, taken by the marking process with the laser beam;

switching the laser beam to a second head for marking at least one dot or line according to a second predetermined pattern;

applying continuous or pulsed laser radiation on one or more dots or lines on the surface of the second cylindrical item during rotation thereof according to a second predetermined pattern; and repeating stages of switching and application of laser radiation into marking heads that are currently available until completing the marking of the predetermined patterns for each cylindrical item.

3. A method according to claim 1, further comprising detecting of presence of the cylindrical element between phase A and phase B in a substage thereof, and/or right after the stage D; and once completing the predetermined pattern to be marked, the cylindrical item is being removed from the rotary motion system.

4. A method according to claim 1, wherein while the first item is being processed, a second cylindrical item is placed and processed, by switching in sequence with the previous item, in a second rotary motion system located in the optical field of the marking head of the laser system.

5. A method for rotary marking or machining according to claim 1, wherein the cylindrical element to be marked by laser radiation is placed in at least one of the flat surfaces of the cylindrical element after the D stage.

6. A method according to claim 1, wherein before or after the D stage there is a stage for detecting error by comparison with one or a range of predetermined patterns.

7. A method according to claim 1, wherein the laser marking system includes a stage of sorting and routing.

8. A device for rotary marking or machining of cylindrical natural cork stoppers, agglomerated cork or synthetic materials used to close wine or similar bottles comprising at least one feeder of cylindrical elements in one or more rotary continuous or indexed motion systems; a laser system including means for generating at least one laser beam; means to rotate the cylindrical element on its axis at a constant or variable speed, with the cylindrical surface moving tangentially to the focal plane of the laser system, wherein the improvement comprises: means for measuring instantaneous tangential speed of the cylindrical surface and direction of rotation, means for focusing the laser beam and correcting optical microprocessor control, and means for spatial modulation of laser beams synchronized with the instantaneous tangential velocity on the surface of the cylindrical element.

9. A device for rotary marking or machining according to claim 8, further comprising:

one or more laser marking heads including at least two rotary motion systems, which have at least one item each;

a laser beam for marking one or more adjacent dots according to a first predetermined pattern selected for reproduction;

means for selecting a second marking head that is available at a predetermined time, for marking one or more adjacent dots on a second cylindrical item, the selection based on reduction of the total amount of time taken by the marking process with the laser beam;

means for switching the laser into the second marking head at a predetermined time, and means for temporal modulation of the laser beam for marking at least one dot or line according to a second predetermined pattern;

means for the spatial modulation are suitable for the application of a continuous or pulsed laser radiation on one or more dots or lines on the surface of the second cylindrical element during his rotation according to a second predetermined pattern;

microprocessor control based means capable of repeating the steps of switching and applying the laser beam radiation into the available marking heads until completion of the marking of the predetermined patterns for each cylindrical element.

10. A device according to claim 9, wherein the temporal modulator creates a minimum of a first order laser beam deflection at a resulting angle with respect to an original laser beam axis, controlled by the frequency value of the applied radio frequency and the wavelength of the laser generator being used.

11. A device according to claim 9, wherein the reflected laser beam of "n" order is directed to a means of collimation and then to the spatial modulation system, and the beam of order 0 is guided to a beam dump and discarded in a controlled manner.

12. A device according to claim 9, wherein the laser pulses generated by means of temporal modulation have a substantially flat power distribution along the pulse length.

13. A device for rotating marking or machining for cylindrical materials according to claim 8, additional comprising:

means for detecting the presence of such cylindrical elements in rotary motion continuous or discontinuous systems; and/or means for extracting the cylindrical elements from the rotary and continuous or discontinuous motion systems.

14. A device for rotary marking or machining according to claim 8, wherein the device includes a laser marking head for at least marking one of the flat surfaces of the cylindrical element.

15. A device for rotary marking or machining according to claim 8, wherein the different heads are suitable for processing in parallel cylindrical elements with variable lengths and/or different predetermined patterns at each marking head.

16. A device for rotary marking or machining according to claim 8, wherein each marking head can mark two cylindrical elements that fit in the field of the laser beam projected through the spatial modulator.

17. A device according to claim 8, wherein the laser beam is pulsed by means of temporal electronic modulation applied to the laser generator power supply.

18. A device according to claim 8, wherein the laser beam is modulated using means for spatial modulation that includes at least one of the following deflection types: polygonal spinning mirror, piezoelectric scanner, high-resolution acoustic-optical deflector, linear guide, or a set of XY galvanometric scanners.

19. A device according to claim 18, wherein the laser beam is applied over a time range between 0 and the maximum exposure time available, depending on the duration of the line and the number of dots to be generated along the line, for a given dot, dot belonging to the line or to the XY plane being reproduced.

20. A device according to claim 19, wherein laser pulses repetition rate is synchronized in time and space with the particular position that spatial modulation means shall point at every moment in time.

21. A device according to claim 20, wherein repetition of dots, or image scanned lines are synchronized with the movement or progress of the cylindrical lateral surface of the element to be marked by means of measuring speed and direction as well as means for sensing a cylindrical element, and wherein the means of measuring speed and direction include an incremental tachometer coupled with the axis of rotation or shaft of the cylindrical elements rotating system.

22. A device according to claim 8, further comprising means for marking verification, based on vision systems.

23. A device according to claim 8, further comprising means to classify such cylindrical items expelled after the marking process.

24. A device according to claim 8, wherein the marking process occurs on cylindrical items that include an additive that reacts to laser radiation.

* * * * *